Patented May 10, 1938

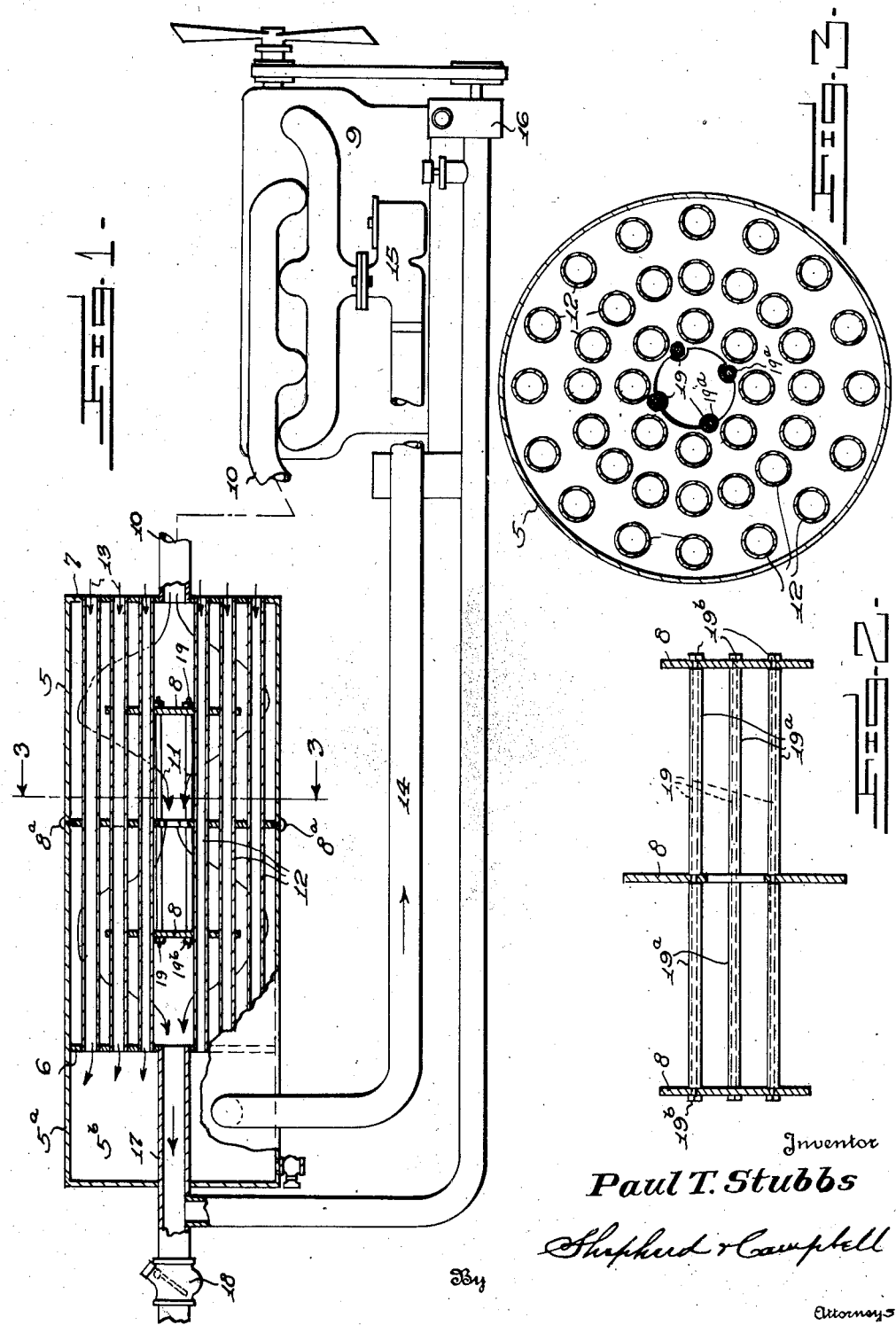

2,116,718

UNITED STATES PATENT OFFICE 2,116,718

COMBINED MUFFLER, AIR PREHEATER AND EXHAUST HANDLING SYSTEM

Paul T. Stubbs, West Haven, Conn.

Application December 29, 1936, Serial No. 118,149

4 Claims. (Cl. 123—122)

This invention relates to a combined muffler, air preheater and exhaust handling system for internal combustion engines. It has for its object to provide a very simple combination and correlation of parts by means of which the exhaust gases from an internal combustion engine are caused to travel in a tortuous path over a bank of tubes through which atmospheric air for the carburetor is drawn to the engine. The exhaust gases are handled at least in part by a vacuum pump which is driven from the engine so that there is a balanced relation between exhaust gas delivery and the vacuum maintained.

Further, the subjecting of the exhaust gases to the cooling action of the tubes through which the atmospheric air is being drawn to the carburetor results in marked temperature reduction in the gases with corresponding decrease in volume. This, in conjunction with the partial vacuum maintained by the engine driven vacuum pump, markedly aids in relieving back pressure upon the engine, with resultant economy in engine operation. Further objects and advantages of the invention will be set forth in the detailed description which follows:

In the accompanying drawing:

Figure 1 is a diagrammatic view of the system with the muffler and preheater in section;

Fig. 2 is a detail view of baffles, hereinafter described, and

Fig. 3 is a transverse sectional view on line 3—3 of Fig. 1 showing the central baffle in elevation.

Like numerals designate corresponding parts in all of the figures of the drawing.

Referring to the drawing, 5 designates a containing shell, preferably of copper, provided with the heads 6 and 7. Baffle plates 8, disposed within the shell, cause the exhaust gases delivered from an internal combustion engine 9 through exhaust pipe 10, to travel in a tortuous path as indicated by the arrows 11 around and between a bank of tubes 12, the ends of which tubes open through heads or plates 6 and 7. Atmospheric air passes through the tubes as indicated by the arrows 13, and this air is heated by its passage through the tubes and is delivered through a pipe 14 to the carburetor of the engine 15.

A vacuum pump or fan, indicated at 16, is driven by the engine 9 and aids in reducing pressure in the discharge line 17 of the exhaust, said line receiving the exhaust gases after they have passed through the compartment defined by the shell 5 and the heads 6 and 7. An outwardly opening check valve 18 is preferably disposed in the line 17. Tie rods 19 extend longitudinally of the shell 5 and tie the baffles together. Spacers 19ª surround the tie rods 19 and space the baffles apart, and nuts 19ᵇ hold the parts together. The central baffle 8 may be secured to the shell by welding or by screws 8ª.

With the engine 9 in operation, the exhaust gases from the engine pass first through pipe 10 to the interior of shell 5, thence as indicated by the arrows 11 around and among tubes 12, and thence to exhaust line 17. At the same time, the vacuum pump or fan 16, the speed of which is in determined relation to the speed of the engine and consequently in determined relation to the volume of exhaust gases delivered to pipe 10, aids in maintaining a balanced degree of pressure reduction in line 17. The preheating of the carburetor air supply by its passage through the tubes 12 will, it is thought, be understood without further description.

I wish to emphasize the extreme simplicity and economy in construction of the arrangement herein shown and described. Note that while the assembly will carry out the several objects described, the elements necessary are so combined as to longitudinally align the various elements of the muffler and preheater structure in such fashion that they are very simply assembled by the placing of the tie rods in position. An extension 5ª of shell 5 provides a compartment 5ᵇ with which pipe 14 is in communication and into which the air from all of the tubes 12 is discharged.

The installing of the vacuum muffler of this invention as herein shown and described will yield important beneficial and economical results, among which may be mentioned the following. The rapid cooling of the exhaust gases reduces back pressure upon the engine in such manner that fuel consumption will be reduced. This effect will be particularly evident at high speeds, because at this time cool air is forced through the tubes with great rapidity. In addition, this forcing of the air through the tubes induces an actual pressure in chamber 5ᵇ, and this in turn has the effect of a supercharger for the engine, because the carburetor is connected to this hot air chamber.

The increased efficiency derived from the foregoing causes will render it unnecessary to use so large an automobile engine, and thus a saving to the manufacturer and car owner will be effected. The muffler is not limited to use with the vacuum pump, and if the pump should be stopped for any reason, the check valve will open and permit the muffler to function in the usual way.

It is to be understood that the invention is not limited to the precise construction set forth, but that it includes within its purview such changes as fairly come within either the terms or the spirit of the appended claims.

Having described my invention, what I claim is:

1. In combination, an air preheater and muffler comprising an elongated shell, a pair of heads, one of which is located at the front of the shell and the other of which spans said shell at a point spaced from the rear end of said shell to thereby leave a space within said shell rearwardly of said head, an additional head closing the rear end of the shell and forming a closed rear compartment of said space, a bank of longitudinally disposed tubes extending through said first named pair of heads, atmospheric air entering the forward ends of said tubes and passing therethrough to the said rear compartment, an internal combustion engine, means for conducting the exhaust gases therefrom to the space within the shell and between the two first named heads, a vacuum pump driven by the internal combustion engine, a pipe leading from the rear compartment to the carburetor of the engine, an exhaust pipe leading from the space between the first named pair of heads, and a pipe leading from the exhaust pipe to the vacuum pump, said tubes being of such size and number that their combined capacity is sufficient to permit the passage of atmospheric air in such volume as to materially reduce the volume of the exhaust gases by the reduction in temperature of said gases, brought about by the passage of such volume of air through the tubes.

2. In combination, an air preheater and muffler comprising an elongated shell, a pair of plane heads, one of which is located at the front of the shell and is exposed over substantially its entire area to incoming atmospheric air, and the other of which spans said shell at a point spaced from the rear end of said shell to thereby leave a space within said shell rearwardly of said head, an additional head closing the rear end of the shell and forming a closed rear compartment of said space, a bank of longitudinally disposed tubes extending through said first-named pair of heads and through the space between said heads, atmospheric air entering the forward ends of said tubes and passing therethrough to the said rear compartment, an exhaust pipe connection leading centrally through the said front head to discharge exhaust gases into the space within said shell and between the first-named pair of heads, baffle plates extending transversely of the tubes within said space and through which said tubes pass, said baffle plates being shaped to cause exhaust gases entering said shell to take a tortuous path around the exteriors of said tubes, an exhaust pipe leading substantially centrally from the rear one of the first-named pair of heads and from the space between the first-named pair of heads through said closed rear compartment, a carburetor air connection leading from said rear compartment, and a suction line connection connected to the path of the exhaust gases, said tubes being of such size and number that their combined capacity is sufficient to permit the passage of atmospheric air in such volume as to materially reduce the volume of the exhaust gases by the reduction in temperature of said gases brought about by the passage of such volume of air through the tubes.

3. A structure as recited in claim 2, in combination with an internal combustion engine, a vacuum creating element driven in unison with said engine, a carburetor for said engine to which the said carburetor air connection leads, said suction line leading from the vacuum creating element of the engine, and said tubes being of such size and number that their combined capacity is sufficient to permit the passage of atmospheric air in such volume as to materially reduce the volume of the exhaust gases by the reduction in temperature of said gases, brought about by the passage of such volume of air through the tubes.

4. In combination, an air preheater and muffler comprising an elongated shell, a pair of plane heads, one of which is located at the front of the shell and is exposed over substantially its entire area to incoming atmospheric air, and the other of which spans said shell at a point spaced from the rear end of said shell to thereby leave a space within said shell rearwardly of said head, an additional head closing the rear end of the shell and forming a closed rear compartment of said space, a bank of longitudinally disposed tubes extending through said first-named pair of heads and through the space between said heads, atmospheric air entering the forward ends of said tubes and passing therethrough to the said rear compartment, an exhaust pipe connection leading centrally through the said front head to discharge exhaust gases into the space within said shell and between the first-named pair of heads, an exhaust pipe leading substantially centrally from the rear one of the first-named pair of heads and from the space between the first-named pair of heads through said closed rear compartment, a carburetor air connection leading from said rear compartment, and a suction line connection connected to the path of the exhaust gases, said tubes being of such size and number that their combined capacity is sufficient to permit the passage of atmospheric air in such volume as to materially reduce the volume of the exhaust gases by the reduction in temperature of said gases, brought about by the passage of such volume of air through the tubes.

PAUL T. STUBBS.